United States Patent
Hug et al.

(10) Patent No.: US 7,185,195 B2
(45) Date of Patent: Feb. 27, 2007

(54) CERTIFICATE BASED DIGITAL RIGHTS MANAGEMENT

(75) Inventors: Joshua D. Hug, Seattle, WA (US); Xiaodong Fu, Herndon, VA (US)

(73) Assignee: Realnetworks, Inc., Seattle, WA (US)

( * ) Notice: Subject to any disclaimer, the term of this patent is extended or adjusted under 35 U.S.C. 154(b) by 394 days.

(21) Appl. No.: 10/736,451

(22) Filed: Dec. 14, 2003

(65) Prior Publication Data

US 2005/0132209 A1  Jun. 16, 2005

(51) Int. Cl.
*H04L 9/00* (2006.01)

(52) U.S. Cl. .................. 713/156; 713/175; 713/193; 726/32

(58) Field of Classification Search .................. 713/156
See application file for complete search history.

(56) References Cited

U.S. PATENT DOCUMENTS

| | | | |
|---|---|---|---|
| 5,943,422 A | 8/1999 | Van Wie et al. | |
| 6,240,185 B1 | 5/2001 | Van Wie et al. | |
| 6,327,652 B1 | 12/2001 | England et al. | |
| 6,330,670 B1 | 12/2001 | England et al. | |
| 6,449,367 B2 | 9/2002 | Van Wie et al. | |
| 6,513,117 B2 | 1/2003 | Tarpenning et al. | |
| 6,535,871 B1 | 3/2003 | Romansky et al. | |
| 6,618,484 B1 | 9/2003 | Van Wie et al. | |
| 6,636,966 B1 | 10/2003 | Lee et al. | |
| 6,772,340 B1 | 8/2004 | Peinado et al. | |
| 6,912,294 B2* | 6/2005 | Wang et al. | 382/100 |
| 6,993,137 B2* | 1/2006 | Fransdonk | 380/279 |
| 2001/0051996 A1* | 12/2001 | Cooper et al. | 709/217 |
| 2002/0007456 A1* | 1/2002 | Peinado et al. | 713/164 |
| 2002/0077986 A1* | 6/2002 | Kobata et al. | 705/52 |
| 2002/0152173 A1* | 10/2002 | Rudd | 705/57 |

OTHER PUBLICATIONS

Conrado et al.; Privacy in an identity-based DRM system Sep. 1-5, 2003; IEEE; pp. 389-395.*

* cited by examiner

*Primary Examiner*—Kambiz Zand
(74) *Attorney, Agent, or Firm*—John C. Stewart (57) ABSTRACT

In accordance with one embodiment of the present invention, a digital certificate is used to link an arbitrary provisioned right with an associated arbitrary digital action to be performed by a client device on or with respect to a protected digital content object. In one embodiment, the certificate is associated with one or more secure components, which are utilized by the client device in association with performance of the digital action.

10 Claims, 6 Drawing Sheets

FIGURE 1

```
<License>
    <rights>
        <action name="burnToCD">
            <restriction count="10"/>
        </action>
        <action name="playback">
            <restriction time="24 hours"/>
        </action>
    </rights>
    <content>
        <id>1983229329</id>
        <key> "base 64 encrypted key </key>
    </content>
    .
    .
</License>
```

210 → rights block
220 → content block
200 → whole License

FIGURE 2

```
<device_description>
    <device Name = "name" / >
    <device Model = "model" / >
    <device S/N = "number" / >
    <device Type = "type" / >
</device_description>
```
300

FIGURE 3A

```
<action name="burnToCD">
    <components>
        <comp1="GUID1" / >    354a
        <comp2="GUID2" / >    354b
        <comp3="GUID3" / >    354c
    </components>
</action>
<signature>
    <id>____</id>
    <key> "base 64 encrypted key </key>
</signature>
```
352 → action/components
356 → signature
350

CERTIFICATE BASED DIGITAL RIGHTS MANAGEMENT

FIELD OF THE INVENTION

Embodiments of the present invention relate to the field of digital rights management.

BACKGROUND OF THE INVENTION

Electronic content can include a wide variety of audio and/or video presentations, such as music, dialogue, still pictures, movies, and the like. With the proliferation of portable playback devices capable of storing and rendering near-identical copies of original audio and/or video content, coupled with the distribution capabilities of the Internet, digital rights enforcement of audio and/or video content has become an increasingly important issue for digital content providers. Rights enforcement typically defines how digital content can be used on a given client device. For example, rights information associated with a piece of digital content may permit rendering of the content by the device, while at the same time preventing copying or distribution of the content.

The management and enforcement of digital rights is typically referred to as digital rights management or "DRM". Although DRM systems (referred to as DRMs) often focus on content security and encryption, DRM may also involve the description, protection, and tracking of rights usage as well as management of relationships between rights holders. DRMs typically utilize a rights expression language (REL) for specifying content rights, types of users qualified to obtain those rights, and the actions necessary to enable content rights transactions. Typically, the rights embodied within a particular DRM system are static and are tied to well-defined actions that may be taken with respect to the content.

However, at the time of release it is not always possible for a DRM or other rights management application or service to foresee all actions that may be desired or otherwise necessary in the future. Accordingly, in order for current day DRMs to recognize such newly defined actions, a new DRM release is typically required. such a release is not always feasible from a cost and/or time perspective, nor is it desirable from a user perspective.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF EMBODIMENTS OF THE INVENTION

In the description to follow, various aspects of the present invention will be described, and specific configurations will be set forth. However, the present invention may be practiced with only some or all aspects, and/or without some of these specific details. In other instances, well-known features are omitted or simplified in order not to obscure the present invention.

The description will be presented in terms of operations performed by a processor based device consistent with the manner commonly employed by those skilled in the art to convey the substance of their work to others skilled in the art. As is well understood by those skilled in the art, the quantities take the form of electrical, magnetic, or optical signals capable of being stored, transferred, combined, and otherwise manipulated through mechanical, electrical and/or optical components of the processor based device.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The description repeatedly uses the phrase "in one embodiment", which ordinarily does not refer to the same embodiment, although it may. The terms "comprising", "including", "having", and the like, as used in the present application, are synonymous.

In accordance with one embodiment of the present invention, digital certificates are used to link arbitrary provisioned rights with an associated arbitrary digital action to be performed on secure content object(s) by a client device equipped with a digital rights management (DRM) agent. In one embodiment, client devices consume content objects in accordance with one or more rights objects, and by way of one or more secure components as may be identified by a digital certificate associated with an action to be performed. The term "client device" (or merely "client") is intended to represent a broad range of digital systems, including devices such as wireless mobile phones, palm sized personal digital assistants, and other general purpose or dedicated portable player devices, notebook computers, desktop computers, set-top boxes, game consoles, and so forth.

Figure 1:
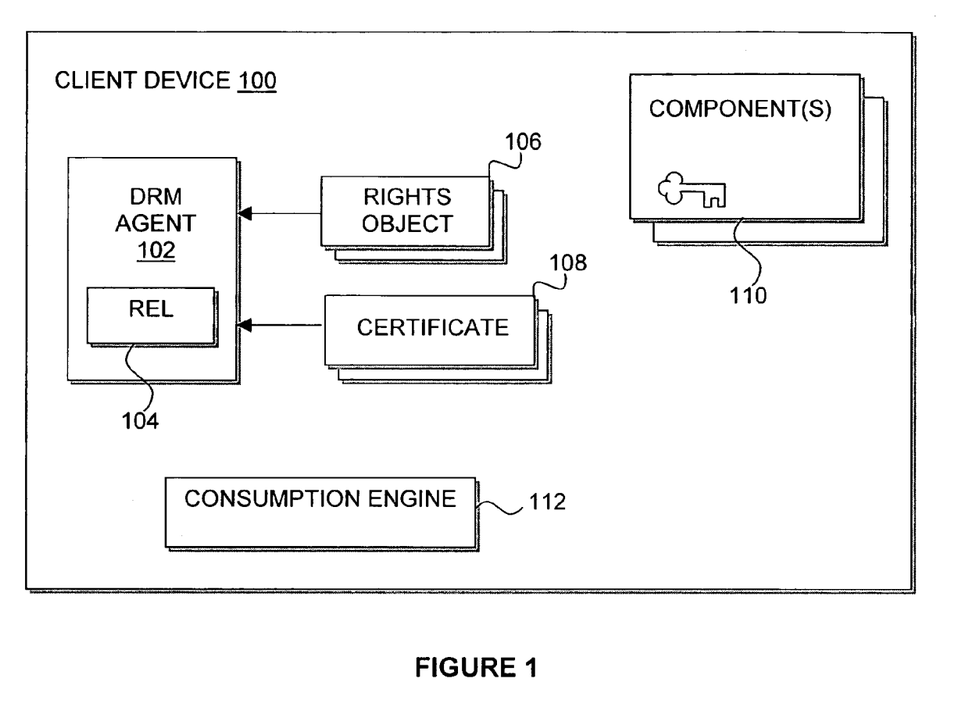
FIG. 1 illustrates a system view of the present invention, in accordance with one embodiment.

FIG. 1 illustrates an example client device 100 equipped with digital rights management (DRM) agent 102 to facilitate consumption of secure content objects by e.g. consumption engine 112. Usage of the term "content object" is intended to broadly refer to a digital resource such as, but not limited to an audio and/or video clip (including motion video and still images), a data file or stream, a ringing tone, a screen saver, a Java applet or any other digital resource, whether alone or combined. Moreover, secure content objects may represent content objects existing in an encrypted form or in a plaintext form delivered inside a secure DRM message.

The term "consumption" as used herein is intended to broadly refer to one or more actions that are performed on or in association with a given content object. For example, consumption may involve the rendering or playback of a particular content object, the access and/or retrieval of content object (whether from memory or a storage device), transcoding of the content object, transferring or "burning" the content object to a CD-ROM or similar large capacity removable storage media (including CD-R, CD-RW, DVD-RW, DVD+RW, DVD-RAM . . . etc.), downloading the content object to a portable player device, and so forth.

In one embodiment, consumption engine 112 may provide various functionalities such as content rendering and content transfer effected by the execution of one or more secure components 110. In one embodiment, consumption engine 112 may represent a digital content player core such as RealOne player available from RealNetworks, Inc. of Seattle Wash. In accordance with the teachings of the present invention, consumption engine 112 may be supplemented with additional functionality in the form of arbitrary digital actions enabled for operation after initial distribution/installation of consumption engine 112 and/or DRM 102.

In one embodiment, DRM agent 102 facilitates performance of indicated actions including, but not limited to the transfer of secure content to one or multiple playback devices, the transfer of content and/or device keys to playback devices, the conversion of a content object into another DRM format, file format, or CODEC format (e.g. transcode), the burning of a content object onto a non-volatile memory device such as a CD-ROM, and so forth. Indications of such actions to be performed may be user-initiated or device-initiated (e.g. via one or more software/hardware components), and may constitute a received data packet, an interrupt, input from a user input device, and so forth.

In one embodiment, DRM agent 102 may receive an indication in the form of an action identifier, such as an action name or action type, identifying the action to be performed. Upon receiving the indication of the action to be performed, DRM agent 102 may identify (e.g. based upon the action identifier) a digital certificate 108 corresponding to the action to be performed. In one embodiment, digital certificate 108 identifies a selected one or more secure components 110 to facilitate performance of the action identified by the certificate. In one embodiment, each secure component is associated with a unique identifier which is used by digital certificate 108 to identify the appropriate ones of secure components 110 to perform an indicated action. In one embodiment, digital certificate 108 identifies an order with which secure components 110 are to be executed in connection with performance of the indicated action. In accordance with one embodiment of the invention, DRM agent 102 may be implemented in tamper resistant code on the client device. Building from this root point of trust, it is possible for the client device to validate (e.g. via digital signatures) the various secure components (e.g. as identified by the digital certificate) that provide elemental functions associated with the desired action.

Secure components 110 may be designed to operate autonomously to perform particular elemental functions, or to operate in conjunction with other components to perform compound or multi-part functions. For example, a selected one of secure components 110 may simply operate to write a content object such as a digital audio track out to a data file using a particular file format. Alternatively, multiple ones of secure components 110 may operate together as part of a combined filter chain used to transcode a particular content object from one manifestation (as e.g. defined by a file format, CODEC, CODEC bitrate, interleaving method, sampling rate, color format, and DRM type), to another.

The term "component", is intended to broadly refer to logic embodied in hardware or firmware, or to a collection of software instructions, possibly having entry and exit points, written in a programming language, such as, for example, C++. A software component may be compiled and linked into an executable program, or installed in a dynamic link library, or may be written in an interpretive language. It will be appreciated that software components may be callable from other components or from themselves, and/or may be invoked in response to detected events or interrupts. Software instructions may be embedded in firmware, such as an EPROM. It will be further appreciated that hardware components may be comprised of connected logic units, such as gates and flip-flops, and/or may be comprised of programmable units, such as programmable gate arrays or processors. In one embodiment, the components described herein are implemented as software components, but may nonetheless be represented in hardware or firmware in other embodiments. A secure component generally is a component that has had all code paths carefully examined to ensure that it behaves appropriately and has been signed to prevent further modification of those inspected secure code paths. In one embodiment, secure components are signed via a digital signature. The DRM, which is termed the root of trust, has been made highly resistant to tampering by non-trusted parties through e.g., the use of obfuscation, code encryption using symmetric or asymmetric encryption techniques, anti static analysis, anti-dynamic analysis, etc.

Each of rights objects 106 of FIG. 1 are intended to represent an instance of rights that define or otherwise represent consumption rules stated in terms of a rights expression language for a particular content object or class of content objects. Rights refer to permissions and constraints that define under which circumstances access may be granted to DRM content. In one embodiment, rights objects are expressed in terms of a rights expression language (REL), such as REL 104, corresponding to a particular DRM implementation. In one embodiment, rights objects may represent one or more digital licenses, however other rights instantiations are possible. In one embodiment, rights objects are provided in encrypted form by rights issuers, where a rights issuer may represent an entity such as a content producer, or a device such as a license server operated by such an entity.

In one embodiment, before a given action is performed, a determination may be made by client device 100 as to whether the client device is authorized to perform the action based upon the existence or non-existence of a rights object authorizing performance of such action. In one embodiment, client device 100 may request an appropriate rights object from a rights issuer if necessary to facilitate performance of the action. Similarly, client device 100 may obtain one or more additional secure components to perform an action as may be determined by digital certificate 108 associated with the action. In one embodiment, the secure components may be obtained/received from the provider of the content object (e.g. content provider) or from a third party.

Figure 2:
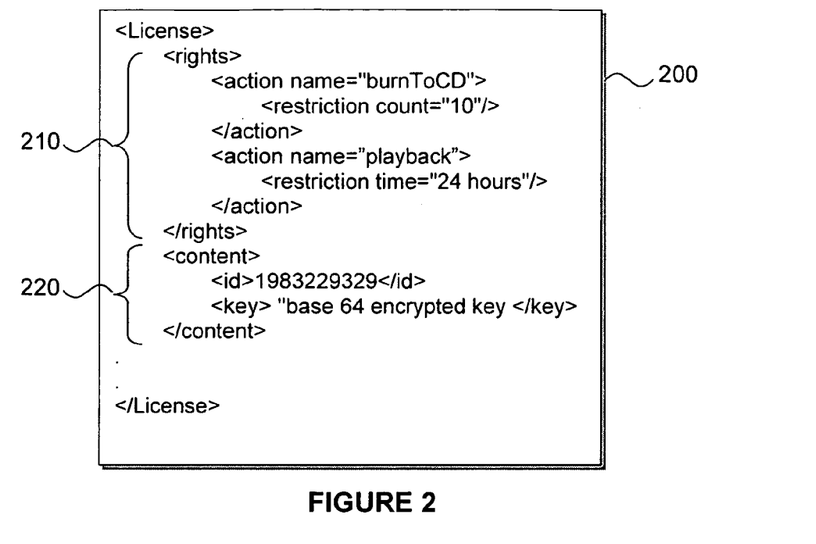
FIG. 2 illustrates an example rights object formed in accordance with one embodiment of the present invention.

FIG. 2 illustrates an example rights object formed in accordance with one embodiment of the present invention. Rights object 200 may be implemented using elements of a rights expression language whether e.g. the rights expression language is text-based, binary-based, or XML-based as shown in FIG. 2. In the illustrated example, rights object 200 includes rights related information 210 granted to client device 100, as well as content-specific information 220. Rights related information 210 may identify a single right or a range of rights to be bestowed upon client device 110. For example, rights related information 210 may identify content actions to be granted to client device 100, such as "playback" or "burnToCD" including limitations placed thereon,. Content-specific information 220 on the other hand may include a content encryption key to facilitate consumption of a particular content object by client device 100.

Figure 3A:
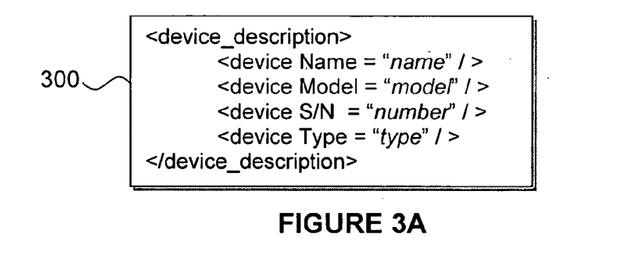
FIGS. 3A and 3B each represent an example digital certificate formed in accordance with one embodiment of the present invention.

FIG. 3A illustrates a device certificate in accordance with one embodiment of the present invention. In one embodiment, device certificate 300 may be used by DRM agent 102 to authorize transfer of a content object or one or more keys to a device identified or otherwise characterized by device certificate 300. In the illustrated embodiment, device certificate 300 may include such information as the name of a device to which the content object is to be transferred, the model of the device, the serial number of the device, and the type of device. However, other device-specific attributes may be identified. In accordance with one embodiment of the invention, device certificates, such as device certificate 300, may be provided to a client device equipped with a DRM agent to facilitate transfer of protected content objects to one or more devices. Moreover, validation of Certificate 300 by the DRM may be tied to an expression of rights within the rights expression language.

As new digital devices are introduced to market, a client device equipped with the teachings of the present invention may download or otherwise obtain a new digital certificate corresponding to the new digital device in order to be authorized to transfer protected content to the new digital device. For example, a digital home entertainment system/network may contain numerous digital devices equipped with DRM agents to facilitate consumption of protected content objects. Unfortunately, current day DRM systems are not capable of dynamically recognizing newly released digital devices nor are they capable of securely transferring protected content to the new digital devices without requiring a DRM upgrade. A client device equipped with a DRM and consumption engine incorporating teachings of the present invention however, may be dynamically provisioned with a digital device certificate, such as device certificate 300, to facilitate recognition of, and secure transfer to one or more new devices.

Figure 3B:
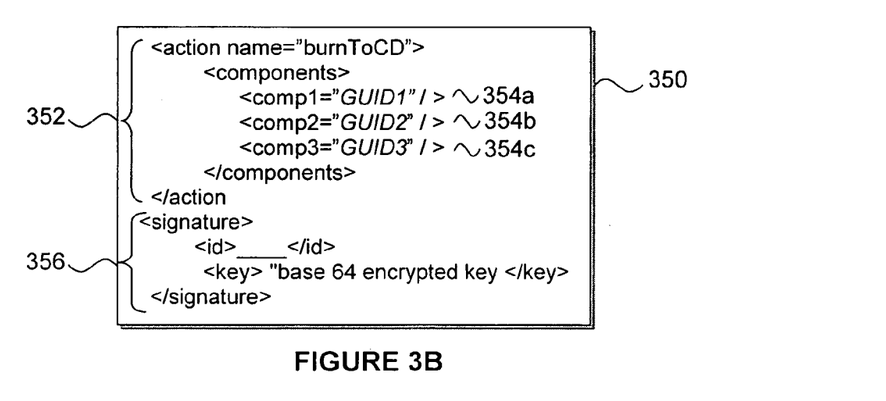

FIG. 3B illustrates an action certificate in accordance with one embodiment of the present invention. In the illustrated embodiment, action certificate 350 identifies an action 352 (e.g. via an action name or action type) and three secure components 354(a–c) to be used e.g. by client device 100 in association with performance of the action 352. In one embodiment, each of secure components 352a, 352b, and 352c may be processed in a designated order such as their order of appearance within certificate 350. In accordance with the illustrated embodiment, action certificate 350 may further include digital signature section 356 to facilitate detection of unauthorized tampering of the certificate. In one embodiment, digital signatures of certificates are signed by a trusted third-party using a root encryption key belonging to a content provider source of the protected content. As such, a client device may validate the authenticity of the certificate by verifying that the digital signature associated with action certificate is correct upon receipt by the client device. The client device may further verify that the secure components identified by the action certificate are present and the digital signature associated with each of the identified secure components is valid.

Figure 4:
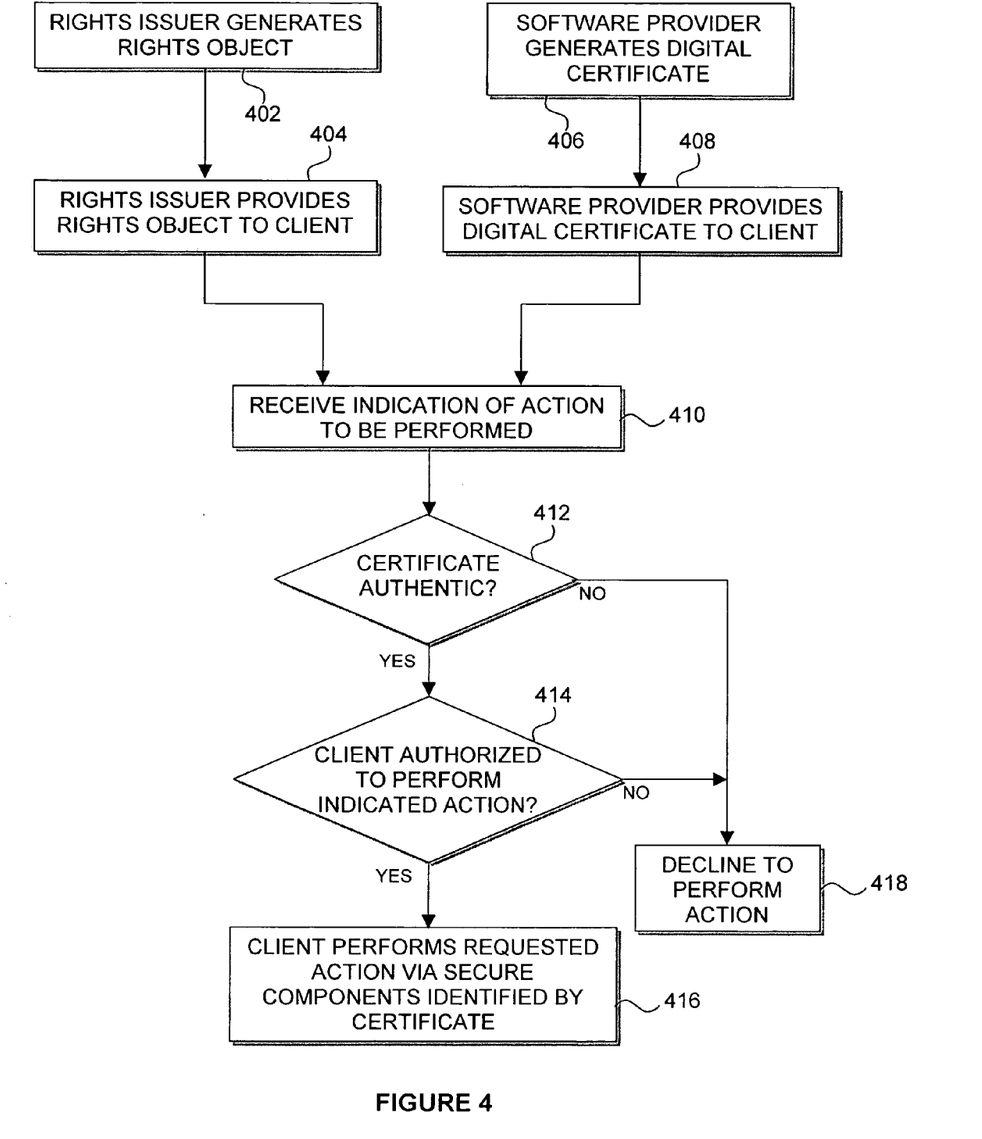
FIG. 4 is a flow diagram illustrating an example system level operational flow, in accordance with one embodiment of the present invention.

FIG. 4 is a flow diagram illustrating an example system level operational flow, in accordance with one embodiment of the present invention. At block 402, a rights issuer generates a rights object corresponding to a newly provisioned right and provides the rights object to a client device at block 404. At block 406, a software provider generates a digital certificate that is associated with an arbitrary digital action and that identifies selected secure components, which when executed operate to perform the indicated action. It should be noted that individually none of the secure components indicated by the digital certificate need-be aware of such a digital action. The digital certificate is then provided to the client device at block 408. At block 410, an indication of an action to be performed is received. The indication may be embodied by an identifier received by the client device. At block 412, a determination is made as to whether the digital certificate is authentic. In one embodiment, the digital certificate is determined to be authentic if a digital signature embedded within the digital certificate is determined to be valid. If the certificate is determined to be authentic, a further determination is then made at block 414 as to whether the client is authorized to perform the indicated action. In one embodiment, the client is deemed authorized to perform the indicated action if the client device possesses a rights object associated with the digital action. If the client device is in fact authorized to perform the digital action, the client device proceeds to perform the digital action at block 416 via execution of the secure components identified in the corresponding digital certificate. However, if it is determined that the certificate is not authentic at block 412, or it is determined that the client is not authorized to perform the indicated action at block 414, the client device declines to perform the action at block 418.

Figure 5A:
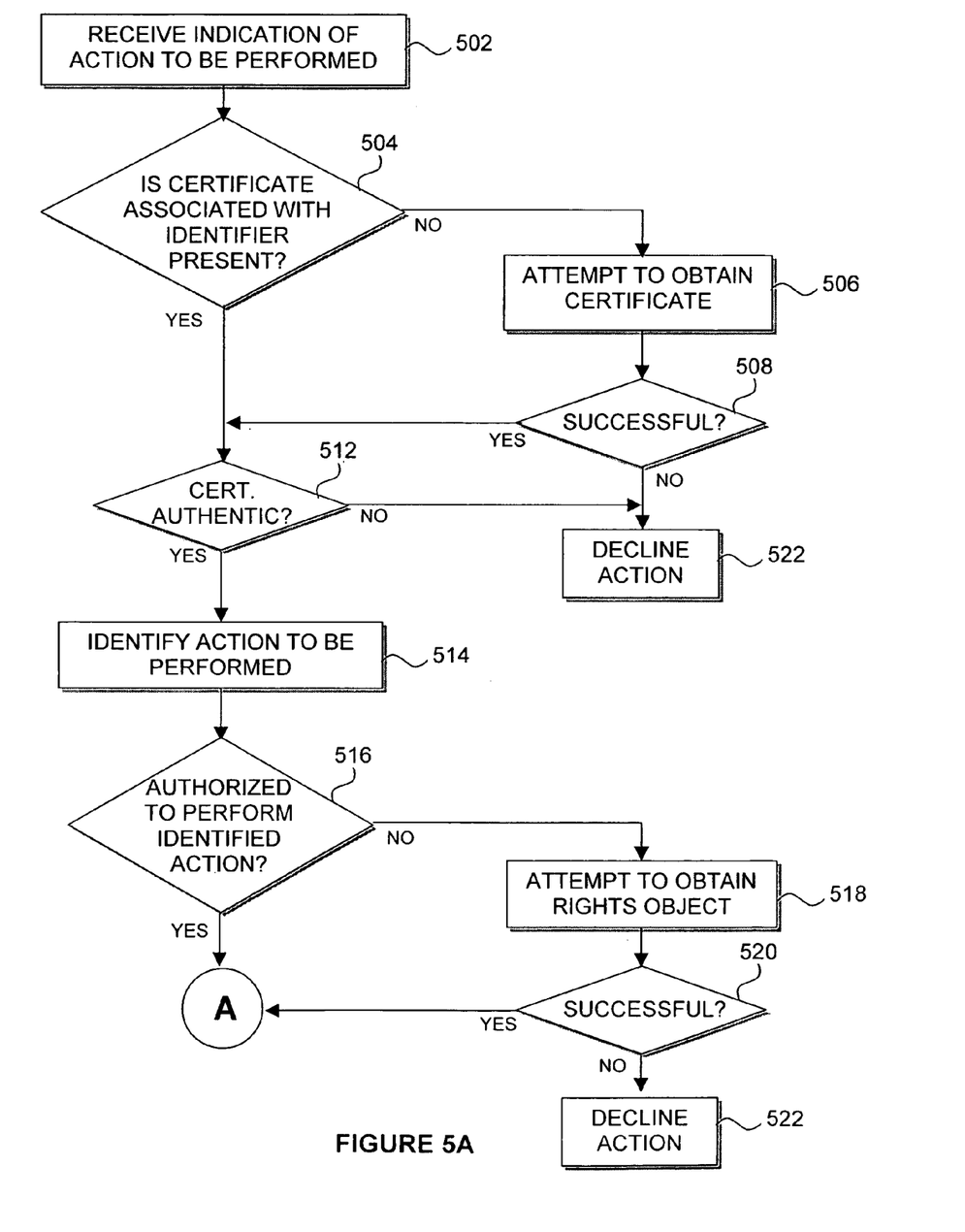
FIG. 5 is a flow diagram illustrating an example operational flow for one embodiment of a client device such as client device 100.
Figure 5B:
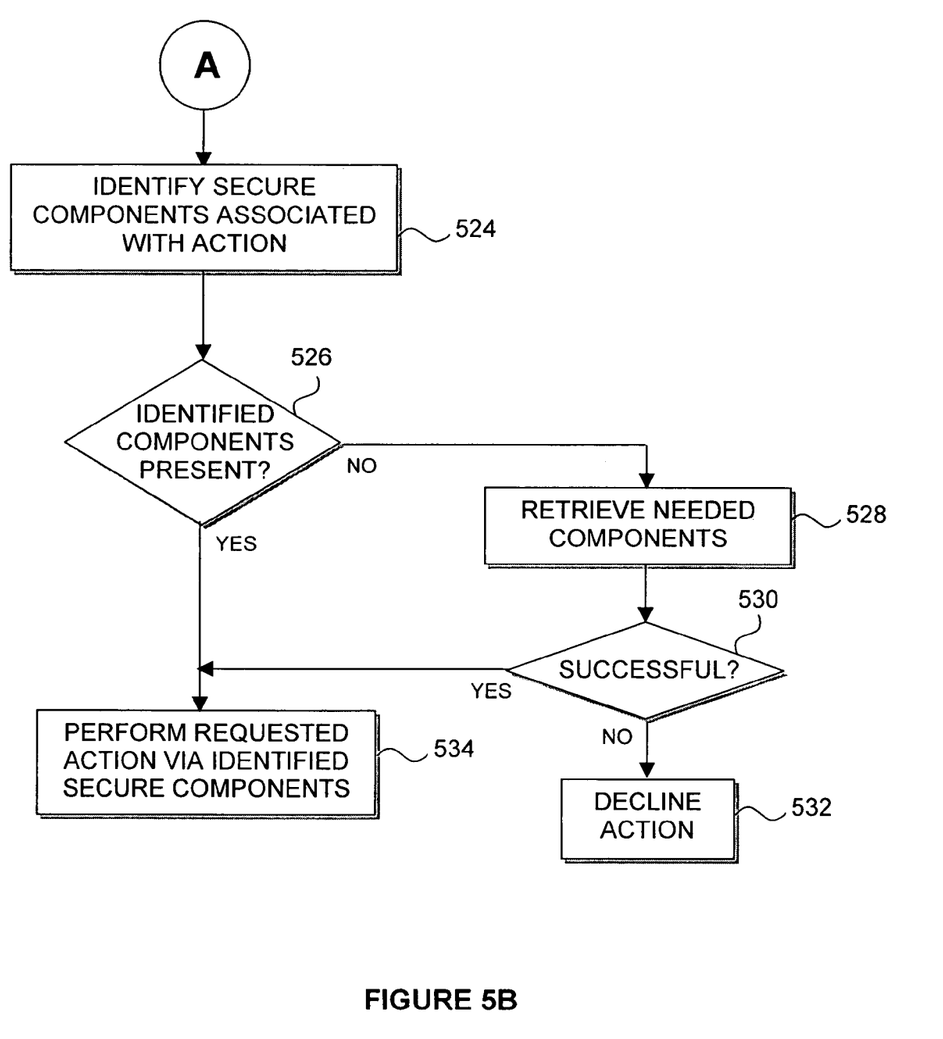

FIG. 5 is a flow diagram illustrating an example operational flow for one embodiment of a client device such as client device 100. In the illustrated embodiment, the process begins at block 502 with the client device receiving an indication of an action to be performed. At block 504, a determination is made as to whether the client device contains a digital certificate associated with the received identifier. If not, the client device may attempt to obtain the appropriate certificate from e.g. a content provider or third party trustee at block 506. If the client device was not successful in obtaining the appropriate certificate at block 508, the client device may then decline to perform the action at block 510. However, if the client device was not successful in obtaining the appropriate certificate at block 508, or if the client device already possessed the appropriate certificate at block 504, the client device makes a determination as to whether the certificate is authentic at block 512. In one embodiment, such a determination may be made by the client device validating the digital signature of the certificate. If the certificate is deemed authentic, the client device identifies an action to be performed e.g. based upon the received identifier at block 514.

At block 516, the client device determines whether it is authorized to perform the identified action. In one embodiment, the client device may be deemed authorized to perform the action based upon the existence of a rights object granting such rights to the client device in coordination with the DRM. IF the client device determines that it is not authorized to perform the identified action, the client device may then attempt to obtain an appropriate rights object from e.g. a rights issuer at block 518. If the client device is not able to successfully obtain the appropriate right object needed to perform the indicated action at block 520, the client device may then decline to perform the action at block 522. However, if the client device is able to successfully obtain the appropriate right object needed to perform the indicated action at block 520, or the client device was originally authorized to perform the indicated action at block 516, the client device may then identify secure components associated with the action as e.g. indicated by the digital certificate at block 524.

At block 526, a determination is made as to whether the client device possesses the identified components. If not, the client device may then attempt to retrieve secure components missing from the client device at block 528. If the client device is not successful in obtaining the missing secure components at block 530, the client device may still decline performance of the action at block 532. However, if the client device is successful in obtaining the missing secure components at block 530, or if the client device originally possessed the secure components identified by the digital certificate at block 526, the client device may proceed to perform the requested action via execution or processing of the secure components identified in the digital certificate at block 534.

Figure 6:
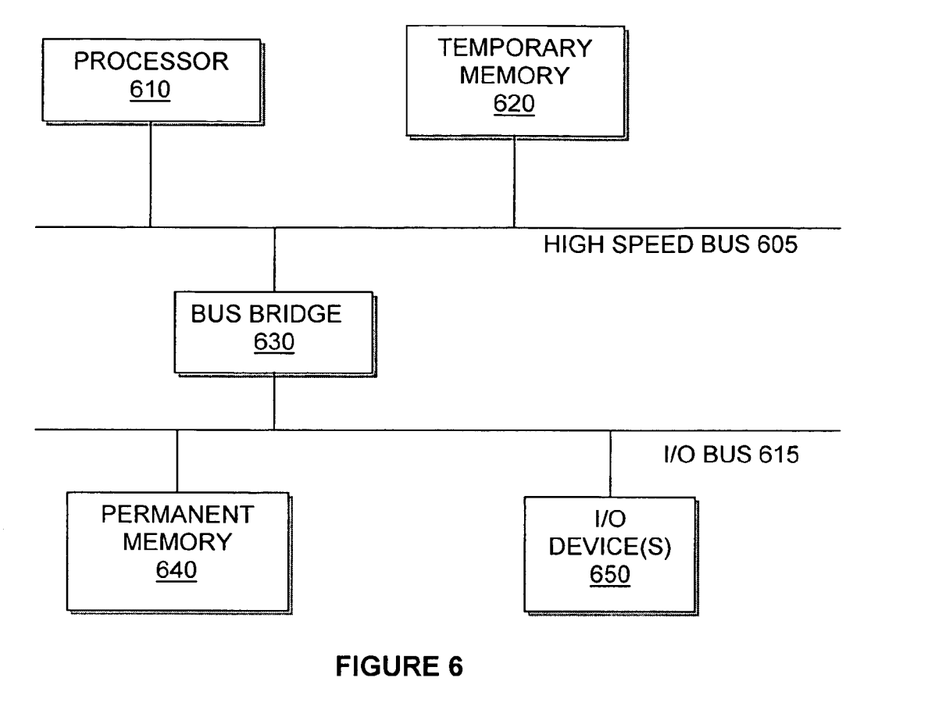
FIG. 6 illustrates one embodiment of a generic hardware system.

FIG. 6 illustrates one embodiment of a generic hardware system suitable for use as client device 100 incorporated with the teachings of the present invention. In the illustrated embodiment, the hardware system includes processor 610 coupled to high speed bus 605, which is coupled to input/output (I/O) bus 615 through bus bridge 630. Temporary memory 620 is coupled to bus 605, while permanent memory 640 and I/O device(s) 650 are coupled to bus 615. I/O device(s) 650 may include a display device, a keyboard, one or more external network interfaces, etc.

Certain embodiments may include additional components, may not require all of the above components, or may combine one or more components. For instance, temporary memory 620 may be on-chip with processor 610. Alternately, permanent memory 640 may be eliminated and temporary memory 620 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Similarly, a variety of alternate internal networks could be used including, for instance, an internal network based on a high speed system bus with a memory controller hub and an I/O controller hub. Additional components may include additional processors, a CD ROM drive, additional memories, and other peripheral components known in the art.

In one embodiment, the hardware system of FIG. 6 operating as client device 100 may be coupled to a local area network (LAN), an internet protocol (IP) network, etc. For example, client device 100 may be communicatively coupled to a rights issuer and/or content provider via a shared network. In one embodiment, the present invention as described above may be implemented as software routines executed by one or more execution units within a computing device. For a given computing device, the software routines can be stored on a storage device, such as permanent memory 640.

Figure 7:
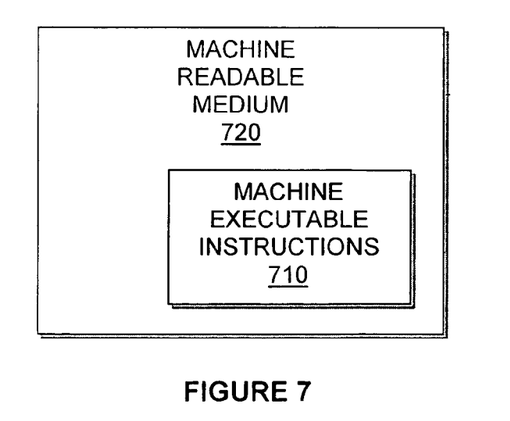
FIG. 7 illustrates one embodiment of a machine-readable medium to store executable instructions for embodiments of the present invention.

Alternately, as shown in FIG. 7, the software routines can be machine executable instructions 710 stored using any machine readable storage medium 720, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 650 of FIG. 6.

From whatever source, the instructions may be copied from the storage device into temporary memory 620 and then accessed and executed by processor 610. In one implementation, these software routines may be written in the C programming language. It is to be appreciated, however, that these routines may be implemented in any of a wide variety of programming languages.

In alternate embodiments, the present invention as described above may be implemented in discrete hardware or firmware. For example, one or more application specific integrated circuits (ASICs) could be programmed with one or more of the above-described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

While embodiments of the present invention have been described in terms of the foregoing embodiments, those skilled in the art will recognize that the invention is not limited to the embodiments described. Other embodiments can be practiced with modification and alteration within the spirit and scope of the appended claims. Thus, the description is to be regarded as illustrative instead of restrictive.

What is claimed is:

1. In a client device equipped with a digital rights management system (DRM), a method comprising:
   receiving a digital certificate associating an arbitrary digital action with a selected one or more of a plurality of secure components to facilitate performance of the digital action on protected content by the client device;
   verifying whether the digital certificate is authentic;
   determining whether the client device is authorized to perform the digital action;
   performing the digital action via execution of the one or more secure components if the digital certificate is authentic and the client device is authorized to perform the requested action; and
   wherein each of the selected one or more secure components is associated with a corresponding unique identifier and the digital certificate includes unique identifiers of a plurality of unique identifiers corresponding to each of the selected one or more secure components.

2. The method of claim 1, further comprising determining whether each of the selected one or more secure components are stored on the client device.

3. The method of claim 2, further comprising dynamically obtaining those of the selected one or more secure components stored external to the client device.

4. A method comprising:
   generating a plurality of secure components to facilitate performance of one or more digital content related actions by a client device;
   generating a digitally signed certificate associating an arbitrary digital action with a selected one or more of the plurality of secure components;
   providing the digital certificate to the client device; and
   wherein each of the plurality of secure components is associated with a corresponding unique identifier and the digital certificate includes unique identifiers of a plurality of unique identifiers corresponding to each of the selected one or more secure components.

5. The method of claim 4, further comprising:
   providing the selected one or more of the plurality of secure components to the client device.

6. A machine readable medium having stored thereon machine executable instructions, which when executed by a client device equipped with a digital rights management system (DRM), operate to implement a method comprising:
  receiving a digital certificate associating an arbitrary digital action with a selected one or more of a plurality of secure components to facilitate performance of the digital action on protected content by the client device;
  verifying whether the digital certificate is authentic;
  determining whether the client device is authorized to perform the digital action;
  performing the digital action via execution of the one or more secure components if the digital certificate is authentic and the client device is authorized to perform the requested action; and
  wherein each of the selected one or more secure components is associated with a corresponding unique identifier and the digital certificate includes unique identifiers of a plurality of unique identifiers corresponding to each of the selected one or more secure components.

7. The machine readable medium of claim 6, further comprising instructions to determine whether each of the selected one or more secure components are stored on the client device.

8. The machine readable medium of claim 7, further comprising instructions to dynamically obtain those of the selected one or more secure components stored external to the client device.

9. A machine readable medium having stored thereon machine executable instructions, which when executed operate to implement a method comprising:
  generating a plurality of secure components to facilitate performance of one or more digital content related actions by a client device;
  generating a digitally signed certificate associating an arbitrary digital action with a selected one or more of the plurality of secure components;
  providing the digital certificate to the client device; and
  wherein each of the plurality of secure components is associated with a corresponding unique identifier and the digital certificate includes unique identifiers of a plurality of unique identifiers_corresponding to each of the selected one or more secure components.

10. The machine readable medium of claim 9, further comprising instructions to provide the selected one or more of the plurality of secure components to the client device.

* * * * *